(12) United States Patent
Geist et al.

(10) Patent No.: US 8,385,532 B1
(45) Date of Patent: Feb. 26, 2013

(54) REAL-TIME DETECTIVE

(75) Inventors: Marc Geist, Broomfield, CO (US);
Henry Paddock, Boulder, CO (US); Pat Tendick, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1268 days.

(21) Appl. No.: 12/119,352

(22) Filed: May 12, 2008

(51) Int. Cl.
*H04M 1/64* (2006.01)
*G06F 19/00* (2011.01)
*G06Q 30/00* (2012.01)

(52) U.S. Cl. ............ 379/265.03; 379/88.11; 379/88.18; 379/265.06; 379/265.12; 379/266.07; 700/96; 702/180; 702/183; 704/231; 705/7.29; 705/14.49; 705/35; 705/39; 709/224; 709/225; 725/135

(58) Field of Classification Search .......... 379/88.11, 379/88.18, 265.03, 265.06, 265.12, 266.07; 700/96; 704/231; 455/414.1; 702/180, 183; 705/7.29, 14.49, 35, 39; 709/224, 225; 714/723; 725/135

See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |

(Continued)

FOREIGN PATENT DOCUMENTS

| CA | 2143198 | 1/1995 |
|---|---|---|
| CA | 2174762 | 3/1996 |

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

*Primary Examiner* — Gerald Gauthier
(74) *Attorney, Agent, or Firm* — Sheridan Ross P.C.

(57) ABSTRACT

Methods, devices, and systems are provided for monitoring and reporting various metrics associated with objects of interest. The present invention is adapted to monitor objects of interest, such as contact center agents, to determine whether a triggering event has occurred and, if so, report metrics associated with the object of interest in a dynamic, customized, and real-time fashion.

18 Claims, 4 Drawing Sheets

U.S. PATENT DOCUMENTS

| | | | |
|---|---|---|---|
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,049,764 A * | 4/2000 | Stahl | 702/183 |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,084,954 A | 7/2000 | Harless | |
| 6,088,441 A | 7/2000 | Flockhart et al. | |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | |
| 6,353,810 B1 | 3/2002 | Petrushin | |
| 6,356,632 B1 | 3/2002 | Foster et al. | |
| 6,366,668 B1 | 4/2002 | Borst et al. | |
| 6,389,028 B1 | 5/2002 | Bondarenko et al. | |
| 6,389,132 B1 | 5/2002 | Price | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Burok et al. | |
| 6,751,310 B1 * | 6/2004 | Crossley | 379/266.07 |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,901,442 B1 * | 5/2005 | Schwaller et al. | 709/224 |
| 6,937,705 B1 * | 8/2005 | Godfrey et al. | 379/88.18 |
| 6,947,543 B2 | 9/2005 | Alvarado et al. | |
| 7,035,927 B2 | 4/2006 | Flockhart et al. | |
| 7,181,302 B2 * | 2/2007 | Bayne | 700/96 |
| 7,251,760 B2 * | 7/2007 | Kim et al. | 714/723 |
| 7,444,263 B2 * | 10/2008 | White et al. | 702/180 |
| 7,483,693 B2 * | 1/2009 | Lueng et al. | 455/414.1 |
| 7,640,199 B1 * | 12/2009 | Hyland | 705/35 |
| 7,725,576 B2 * | 5/2010 | Sitaraman et al. | 709/224 |

| | | | | |
|---|---|---|---|---|
| 7,783,029 | B2 * | 8/2010 | Whitecotten et al. | 379/265.06 |
| 7,856,095 | B2 * | 12/2010 | Brown | 379/265.06 |
| 7,953,219 | B2 * | 5/2011 | Freedman et al. | 379/265.06 |
| 7,962,616 | B2 * | 6/2011 | Kupferman et al. | 709/225 |
| 7,983,412 | B2 * | 7/2011 | Joseph et al. | 379/265.03 |
| 8,060,364 | B2 * | 11/2011 | Bachar et al. | 704/231 |
| 8,102,973 | B2 * | 1/2012 | Peterson | 379/88.11 |
| 8,126,136 | B2 * | 2/2012 | Tong et al. | 379/265.06 |
| 8,135,125 | B2 * | 3/2012 | Sidhu et al. | 379/265.03 |
| 8,139,756 | B2 * | 3/2012 | Yamanaka | 379/265.12 |
| 8,175,253 | B2 * | 5/2012 | Knott et al. | 379/265.03 |
| 8,190,520 | B1 * | 5/2012 | Hyland | 705/39 |
| 2002/0194002 | A1 | 12/2002 | Petrushin | |
| 2003/0174830 | A1 | 9/2003 | Boyer et al. | |
| 2003/0177017 | A1 | 9/2003 | Boyer et al. | |
| 2004/0153437 | A1 * | 8/2004 | Buchan | 707/1 |
| 2004/0203878 | A1 | 10/2004 | Thomson | |
| 2004/0249650 | A1 * | 12/2004 | Freedman et al. | 705/1 |
| 2005/0108775 | A1 * | 5/2005 | Bachar et al. | 725/135 |
| 2007/0156733 | A1 * | 7/2007 | Meyerson | 707/101 |
| 2011/0276396 | A1 * | 11/2011 | Rathod | 705/14.49 |

FOREIGN PATENT DOCUMENTS

| | | |
|---|---|---|
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc. Business Advocate Options, at http://www.avaya.com, downloaded on Feb. 15, 2003, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Foster, Robin, et al., "Avaya Business Advocate and its Relationship to Multi-Site Load Balancing Applications," Avaya, Inc., Mar. 2002, 14 pages.

GEOTEL Communications Corporation Web site printout entitled "Intelligent CallRouter" Optimizing the Interaction Between Customers and Answering Resources., 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features,"Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

McKie, "Notification Systems", DBMS, Jan. 22, 1997, available at http://www.dbmsmag.com/9702d15.html, pp. 1-6.

* cited by examiner

| 304 | 308 | 312 | 316 | 320 | 324 | 328 |
|---|---|---|---|---|---|---|
| Agent Name | Average Contact Time | % Preview Duration | % Active Duration | % Wrap-Up Duration | % Idle Duration | % Held Duration |

| 404 | 408 | 412 |
|---|---|---|
| Customer Contacts | Average Contact Time | Nature Of Contacts |

| 504 | 508 | 512 | 516 | 520 | 524 |
|---|---|---|---|---|---|
| Average Contacts Handled | Average Contact Time | Average Duration | Average Wrap-Up | Average Idle | Average Hold Duration |

REAL-TIME DETECTIVE

FIELD OF THE INVENTION

The invention relates generally to reporting systems and more specifically to dynamic reporting systems used to monitor real-time events and applications.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in a present-day automatic call distributor (ACD), when the ACD system's controller detects that an agent has become available to handle a contact, the controller identifies all predefined contact-handling queues for the agent (usually in some order of priority) and delivers to the agent the highest-priority oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. Contact center efficiency can be measured with a number of different performance parameters, which are usually related to contact center agent performance.

The difficulty in monitoring a contact center's efficiency is that reports showing performance metrics of the contact center are usually static and generated some time after a problem has occurred. The net result of delayed and static reporting, especially to contact center management personnel, is that issues in the contact center cannot be addressed until after the problem has likely passed. When a contact center agent is having a bad day, for example, and the agent's performance metrics are sub-standard, the agent's manager will likely not receive any notice that the agent is having a bad day until the next day. Thus, when the manager attempts to fix the situation it may not need fixing or, worse yet, it may be too late to fix. Also, the problem may not necessarily need fixing on the following day because the agent is having a better day than the previous day.

These problems associated with delayed reporting are not just confined to the world of contact centers. Similar problems exist in market trading (e.g., stock markets, bond markets, future markets, commodities, etc.) and all other businesses where efficiency directly relates to profits. When problems occur, reports related to such problems are generally not produced until after the fact. Even in a stock market trading enterprise, reports regarding the performance of various stocks may be generated rather quickly when a particular event occurs (e.g., a stock price rises above a predetermined price or falls below a predetermined price). However, such reports are usually limited in the amount of information they disseminate (usually just stock price and trading volume information) and in the format of the report.

SUMMARY

It would be desirable to have a reporting system that can proactively monitor the status or performance of objects of interest (e.g., contact center agent performance, employee sales performance, stock performance, bond performance, commodities performance, etc.) and provide dynamic, real-time, and customized reports to interested parties in an intelligent way. More specifically, it would be desirable to have a reporting system that is capable of identifying that a triggering event has occurred and determining possible causes of that triggering event, then generating one or more reports showing the possible cause as well as the continued real-time performance of the object of interest. Such a dynamic and real-time report can help increase the efficiency with which the performance of an object of interest is monitored and managed, whether it is increasing the efficiency of a contact center or it is helping improve profits realized in the stock market.

These and other needs are addressed by various embodiments and configurations of the present invention. The present invention is directed generally to a real-time monitoring and reporting system, device, and method that can be used in a number of different applications including, but not limited to, contact centers, stock trading, bond trading, commodity trading, and the like. In one embodiment, the method comprises:

determining that a triggering event has occurred;

mapping the triggering event to at least one possible cause;

mapping the at least one possible cause to at least one report that displays at least one performance metric that is related to the triggering event in a data field that is dynamically updated as the at least one performance metric changes over time;

and providing the at least one report to an identified recipient.

In accordance with at least one embodiment of the present invention, the object of interest corresponds to a contact center agent and the performance metrics that are monitored in association with that contact center agent relate to the efficiency of performance of the agent.

As can be appreciated by one of skill in the art, a contact is understood herein to include voice calls, emails, chat, video calls, fax, and combinations thereof. Accordingly, a contact center may be equipped to handle any one or a number of the above-noted contact types.

Contact center efficiency is generally measured in two ways. Service level is one measurement of contact center efficiency and is generally determined by dividing the number of contacts accepted within a selected period of time by the number of contacts arriving in a contact center over the same period of time plus the number that were not accepted, but completed in some other way (e.g., abandoned, given busy, canceled, flowed out, etc.). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate, many other performance metrics may be measured, reported, and/or used for preparing various reports in the contact center context. Examples of such metrics include, but are not limited to: contact center traffic, staffing, or occurrences when staff utilization has changed. Additionally, staff behavior can be monitored and analyzed as a possible root cause for one or more triggering events. Moreover, changes in other secondary contact center parameters including system administration parameters like queue assignments and/or vector assignments can be analyzed to determine if they were a contributing factor to the decrease in performance. Various dynamic and/or static reports can be generated and produced based on the monitored parameters.

In a more general market analysis context, the types of metrics that can be monitored and used to produce different reports include, without limitation, stock price of a stock of interest, stock prices of stocks related to a stock of interest, aggregate prices of stocks, recent news in a business industry related to a stock of interest, general economic news, and so forth. Each of these metrics can be used to determine if a triggering event has occurred as well as to determine the possible cause of a triggering event. Furthermore, such metrics may be used to selectively generate customized reports to help display the possible cause of the triggering event.

"Monitoring", as used herein, includes any type of function related to observing, recording, or detecting with instruments that have no effect upon the operation or condition of the element or group of elements that are being monitored.

"Reporting", as used herein, includes functions related to providing compiled data to a user via a user perceptible medium. Reporting may occur through the generation of images on a user interface device (e.g., a screen) or through the production of a paper report that disseminates the compiled data, or through a voice message delivered to a telephone or similar device.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. The computer-readable medium can be a serialized set of instructions encoded in a network transmission over an IP network (e.g., SOAP). Such a medium may take many forms, including but not limited to, non-volatile media, volatile media, and transmission media. Non-volatile media includes, for example, NVRAM, or magnetic or optical disks. Volatile media includes dynamic memory (e.g., RAM), such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute", and variations thereof, as used herein, are used interchangeably and include any type of methodology, process, mathematical operation or technique. More specifically, such terms may include interpreted rules like business process execution language (BPEL) or a rules language where logic is not hard coded but represented in a rules file that can be read in, interpreted, compiled, and executed.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the method(s) and apparatus(es) of certain embodiments of the present invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Moreover, the term "database" as used herein may include not only relational database systems, but any computer storage mechanism, available in both hardware and software, in RAM or on a hard disk. Those skilled in the art will recognize that the disclosed techniques may be used in any communication application in which it is desirable to maintain a SIP survivable network.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized. Examples of such well-known structures include, without limitation, IP infrastructure, Layer 2 switches, Layer IP routers, IP level firewalls, Network Address Translation (NAT) devices, SIP Session Border Controllers (SBCs), etc.

For purposes of explanation, numerous details are set forth in order to provide a thorough understanding of embodiments of the present invention. It should be appreciated, however, that the present invention may be practiced in a variety of ways beyond the specific details set forth herein. More specifically, certain details of the present invention will be described in connection with a contact center and contact center agents. However, one skilled in the art will appreciate that the monitoring and reporting features of the present invention can be practiced in other contexts such as for monitoring and reporting metrics associated with objects in various markets (e.g., stocks, bonds, commodities, futures, etc.) and employees in environments other than a contact center.

Figure 1:
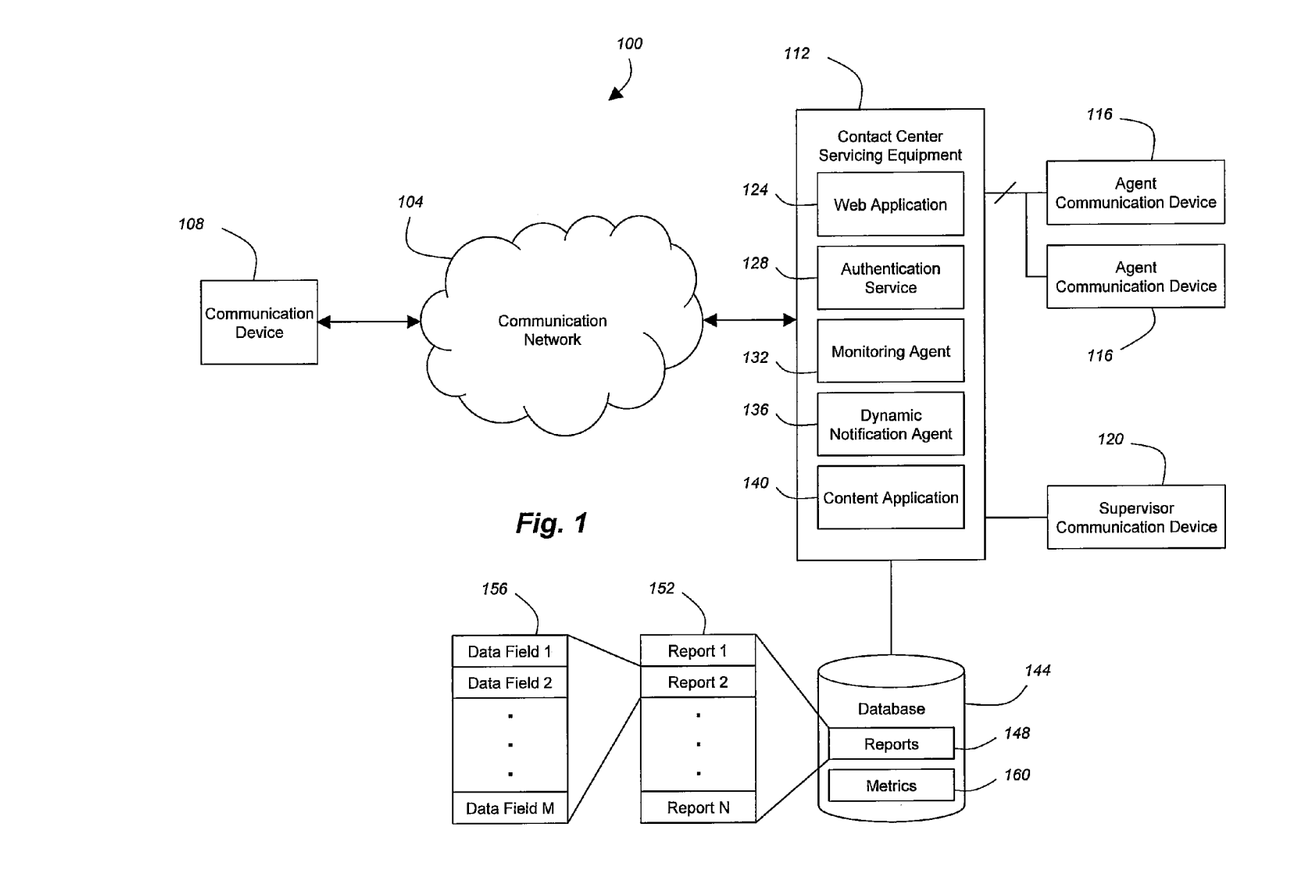
FIG. 1 is a block diagram depicting an exemplary communication system employing monitoring and reporting devices in accordance with embodiments of the present invention.

Referring initially to FIG. 1, an exemplary communication system 100 architecture will be described in accordance with at least some embodiments of the present invention. The communication system 100 comprises a communication network 104 connecting a communication device 108 with a contact center. The communication network 104 may include any type of known collection of data/information transmission equipment. Examples of suitable communication networks 104 include, but are not limited to, the Public Switch Telephone Network (PSTN), a Local Area Network (LAN), a Wide Area Network (WAN) such as the Internet, or any other type of wired and/or wireless network.

The contact center may include contact center servicing equipment 112 that is executed by one or more servers and/or switches associated with the contact center. The contact center servicing equipment 112 may be used to connect the external communication device 108, which may be associated with a customer of the contact center, to an agent communication device 116. Additionally, the contact center servicing equipment 112 may be adapted to provide a supervisor communication device 120 with reports and updates of the performance of agents associated with the agent communication devices 116.

The agent communication devices 116 and/or supervisor communication devices 120 may be packet-switched and/or circuit-switched. Examples of packet-switched communication devices that may be employed in accordance with at least some embodiments of the present invention include IP phones, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, any type of SIP User Agent (UA), and any other communication device. Examples of circuit-switched communication devices that may be wired and wireless analog or DCP telephones, PDAs, H.320 videophones and conferencing units, voice messaging and response units, traditional computer telephony adjuncts, and any other communication device.

It should be noted that the invention does not require any particular type of information transport medium between communications devices, i.e., the invention may be implemented with any desired type of transport medium as well as combinations of different types of transport channels. The components that may be provided in the contact center servicing equipment 112 include, but are not limited to, a web application 124, an authentication service 128, a monitoring agent 132, a dynamic notification agent 136, and a content application 140.

The monitoring agent 132 is provided to monitor the various performance metrics associated with the contact center agent as well as performance metrics associated with the overall contact center. One function of the monitoring agent 132 is to determine whether a triggering event has occurred (e.g., because one or more performance metrics or calculations based on a combination of performance metrics have met or exceed a predetermined threshold). To this end, the monitoring agent 132 may be adapted to monitor the state of each agent (e.g., whether the agent is idle, active, on-hold, on break, etc.). In addition to monitoring the state of the agents in the contact center, the monitoring agent 132 may also be adapted to monitor the nature of each contact between a contact center agent and a customer that initiated the contact. Moreover, the monitoring agent 132 may further be adapted to monitor the contact activity associated with certain customers. For instance, the monitoring agent 132 may determine if a contact being handled by an agent is going too long and, if so, whether the same customer has a history of initiating relatively long contacts. Such information may be used by the dynamic notification agent 136 to determine the possible cause(s) of a triggering event. Additional details of the operation of an exemplary monitoring agent 132 and dynamic notification agent 136 are described in U.S. patent application Ser. No. 11/517,646, entitled "Contact Center Service Monitoring and Correcting", the entire disclosure of which is hereby incorporated herein by reference. The '646 application describes how performance metrics of a contact center can be monitored and some causes of decreased contact center performance can be automatically determined and disseminated to contact center administrators.

The web application 124 may include a server-side web application that provides agent and/or supervisor access to dynamic web-based notifications. As an example, the web application 124 may list notifications for the user and launch pop-ups for displaying content. The web application 124 may be responsible for generating HTML pages that either display information to an agent that can be used by the agent to help service the received contact.

Additionally, the web application 124 may be employed in connection with the dynamic notification agent 136 to provide the supervisor with dynamic Web-based reports that are generated based on a triggering event associated with an agent and determined possible causes of the triggering event. The HTML reports generated by the web application 124 and dynamic notification agent 136 may include information retrieved by the content application 140 from a database 144. More particularly, the content application 140 may be adapted to retrieve metrics 160 as they are updated and insert the current metrics 160 into the relevant data fields 156 of the reports 152 generated by the web application 124 and dynamic notification agent 136. The type of report 152 generated by the web application 124 and dynamic notification agent 136 may be selected from the report store 148 provided in the database 148. As noted above, the report 152 may be generated and sent to the supervisor communication device 120 using HTML and real-time performance metrics 160 can be streamed or pushed into the various fields 156 of the report by the cooperation of the content application 140 and dynamic notification agent 136. In accordance with at least one embodiment of the present invention, the supervisor communication device 120 may utilize client side code, for example Javascript, that processes dynamic web-based notifications transmitted to the supervisor communication device 120 when a report 148 is presented to the supervisor communication device 120. Typically, only a small amount of this code would reside in the web pages sent from the dynamic notification agent 136 to the agent communication device 116 via the web application 124. The script, however, is sufficient to provide dynamic data fields 156 that show current performance metrics associated with a particular agent, a collection of agents, and/or a particular contact initiator.

The authentication service 128 may be provided to authenticate agents with various contact center applications (e.g., the web application 124, the dynamic notification agent 136, and/or the content application 140). In operation, when a user arrives for work at the contact center and begins working on his/her agent communication device 116, the agent may enter a user name and/or password with the authentication service 128. Upon entering the authentication data, the authentication service 128 may determine what applications the agent is allowed to access. Then, the agent communication device 116 may be granted access to the various applications. Of course, the authentication service 128 may also be used to secure the agent communication device 116 until a valid user name and/or password is provided to the authentication service 128. Accordingly, the authentication service 128 may also reside on each agent communication device 116 in addition to residing in the contact center servicing equipment.

Figure 2:
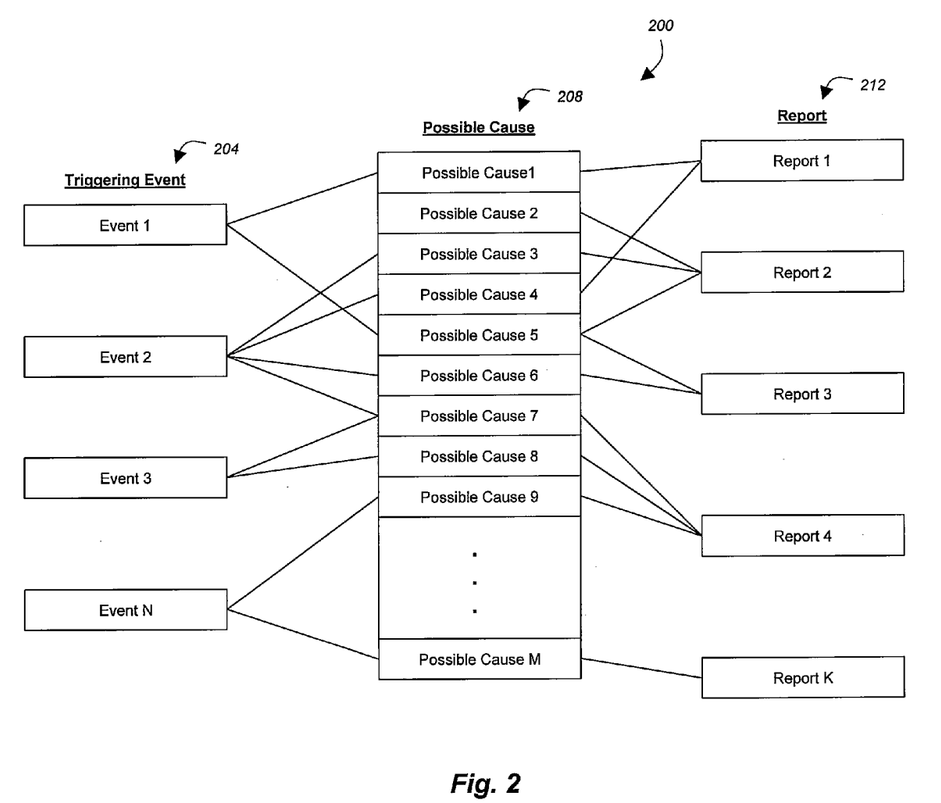
FIG. 2 is a block diagram depicting a mapping of data structures in accordance with embodiments of the present invention.

Referring now to FIG. 2, the mapping of data structures will be described in accordance with at least some embodiments of the present invention. A set of data structures 200 may be mapped together by a cooperative effort of the monitoring agent 132, dynamic notification agent 136, and/or content application 140. The mapping of these various data structures 200 can help determine what type of report 148 should be selected from the possible set of reports 152 and provided to the supervisor communication device 120. More specifically, the monitoring agent 132 may be adapted to determine when a triggering event 204 occurs. A triggering event 204 may include any instance when a single performance metric 160 that is being monitored is detected to meet, exceed, or fall below a predetermined metric threshold. It should be noted that triggers and actions can also be based on statistical trends that occur and are recognized over time. The monitoring agent 132 may also require that the predetermined metric event occur for a predetermined time until actually categorizing the event as a triggering event 204. The monitoring agent 132 may also be adapted to detect triggering events 204 that are based on a combination of performance metrics 160. For instance, a triggering event 204 may occur when a particular performance metric 160 associated with a particular agent exceeds or falls below a current average of the same performance metric 160 by a predetermined amount and/or for a predetermined time. Other triggering events 204 may be detected when the difference between two individual performance metrics exceeds a particular threshold. Triggering events 160 may also comprise a combination of triggering events occurring at substantially the same time. For example a third triggering event may be defined as the simultaneous occurrence of a first and second triggering event.

The monitoring agent 132 is continually monitoring the performance metrics 160 to determine if one or more triggering events 240 occur. Upon detecting the occurrence of a triggering event 240, the monitoring agent 132 may map the triggering event 240 or triggering events 240 to one or more possible causes 208. Each possible cause 208 may have one or more triggering events 204 mapped thereto. The mapping between triggering events 240 and possible causes 208 may be based on knowledge or experience with the contact center and may be entered by an expert system or administrator that has analyzed the performance history of the contact center to identify possible causes associated with various triggering events. In accordance with at least one embodiment of the present invention, the performance metric(s) 160 that are associated with an identified triggering event 160 may also be associated with the possible cause 208 that is mapped to the triggering event 204. For example, performance efficiency of a contact center agent may be a performance metric 160 that is monitored and if that metric falls below a predetermined threshold, then an associated triggering event 204 may be detected. One of many possible causes that may be mapped to such a triggering event 204 may include the cause that the agent is just inefficient without any other reason. Thus, the same performance metric (i.e., inefficiency) that led to the occurrence of the triggering event 204 may also be one of the possible causes 208 mapped to the triggering event 204.

In accordance with at least some other embodiments of the present invention, the performance metric(s) 160 that are associated with an identified triggering event 160 may not be associated with a particular possible cause 208 that is mapped to the triggering event 204. Continuing the example from above, if performance efficiency of a contact center agent is a performance metric 160 that is being monitored and leads to the occurrence of a triggering event 204, a possible cause of the triggering event may be that the contact center agent is handling difficult or complex contacts and/or dealing with difficult customers. Thus, the triggering event 204 may be mapped to a possible cause 208 and each may be associated with completely different performance metrics.

The dynamic notification agent 136 may then map the possible causes 208 with one or more reports 212 that are to be prepared and presented to the supervisor communication device 120. The mapping between possible causes 208 and reports 212 may be based on how the possible causes and the performance metrics 160 associated therewith can be best displayed to an interested party via a report 212. In accordance with at least one embodiment of the present invention, the mapping between possible causes 208 and reports 212 may be based on the number of common performance metrics 160 that are associated with the possible causes 208 and reports 212 respectively. More specifically, a report 212 may be mapped to a possible cause 208 if that report 212 has more than a predetermined number of performance metrics 160 associated therewith that are also associated with the possible cause 208. This mapping is advantageous because reports 212 will generally display the performance metrics 160 associated therewith. Thus, if the report 212 displays more performance metrics 160 associated with a possible cause 208, then that report 212 may be more useful to an interested party (e.g., a supervisor) in determining the actual cause of a triggering event 204.

Another way in which possible causes 208 may be mapped to reports 212 is via user preferences. This type of mapping may be used in substitution to or to augment the performance metric 160 mapping. Each interested party that is set up to receive reports 212 (e.g., on the supervisor communication device 120) may have a set of user preferences associated with their reports and the way in which they prefer viewing certain types of data. Accordingly, a possible cause 208 may be mapped to a particular report 212 if a user desires to see information displayed in a particular fashion to help him/her determine the actual cause of a triggering event 204. For instance, a supervisor might create a custom report that includes a certain set of performance metrics, and said supervisor prefers that any triggering event related to those metrics run their custom report with the appropriate inputs to show the problem related to the triggering event instead of the standard out of the box report. Another example is a supervisor that has responsibility over a group of agents, but the triggering event is that a particular queue is overloaded. In addition to seeing a queue status report for the queue, the supervisor might like to see an agent status report for all the agents in their group that have a particular queue skill. A different supervisor would instead want to see agent status for their agents with the skill in question. In other words they both want the same reports, but with different inputs for the same triggering event.

Figure 3:
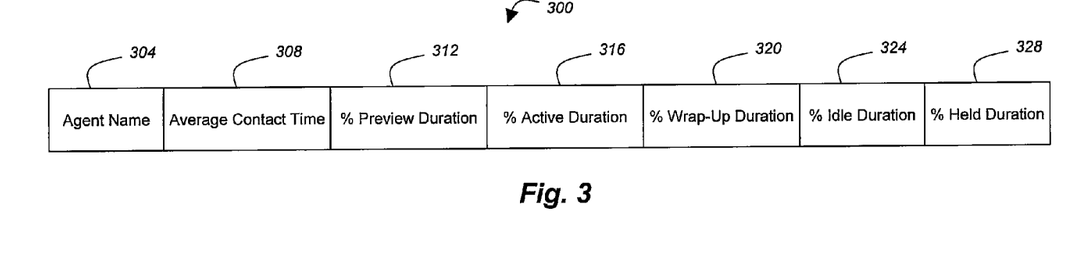
FIG. 3 is a block diagram depicting a data structure for maintaining an individual agent's performance metric information in accordance with embodiments of the present invention.
Figure 4:
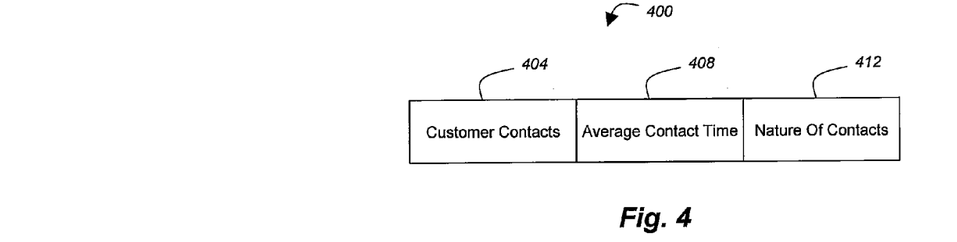
FIG. 4 is a block diagram depicting a data structure for maintaining a customer's information in accordance with embodiments of the present invention.
Figure 5:
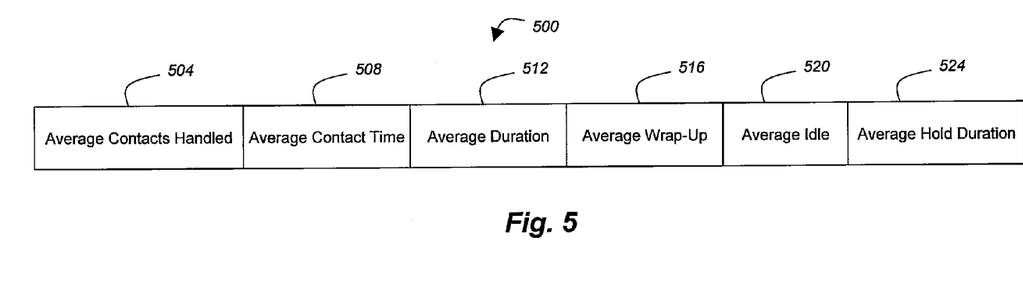
FIG. 5 is a block diagram depicting a data structure for maintaining performance metric information for a collection of agents in accordance with embodiments of the present invention.

Referring now to FIGS. 3-5, various types of data structures that may be used as performance metrics 160 in a contact center environment to determine possible causes 208 of triggering events 204 and prepare reports 212 related thereto will now be described in accordance with at least some embodiments of the present invention. The first type of data structure that may be utilized is an individual agent data structure 300. The individual agent data structure 300 may include a number of different fields of information for tracking certain performance metrics 160 associated with an individual contact center agent. Examples of such fields include, but are not limited to, an agent name or identifier field 304, an average contact handle time field 308 (e.g., for tracking the average amount of time that the agent takes to service either all contacts or contacts of a particular skill level), a percent preview duration field 312 (e.g., for tracking the percent of time that an agent takes to preview a contact), a percent active duration field 316 (e.g., for tracking the percent of time that an agent takes to actively handle a contact), a percent wrap-up duration field 320 (e.g., for tracking the percent of time that an agent takes to wrap-up a contact), a percent idle duration field 324 (e.g., for tracking the percent of on-line time that a particular agent is idle to help show whether the lack of efficiency of the agent is due to lack of work or due to inefficiently handled contacts), and a percent held duration field 328 (e.g., for tracking the percent of time that an agent puts a live contact on hold). Each of the fields (with the exception of the agent identification field 304) may contain performance metrics 160 that are continually updated as the performance of the associated agent changes.

A second type of data structure that may be utilized by the dynamic notification system of the present invention is a customer data structure 400. The customer data structure 400 may include a number of different fields for tracking performance metrics 160 associated with one or a collection of customers that initiate contacts with the contact center servicing equipment 112. The types of fields that may be included, without limitation, in the customer data structure 400 are a number of customer contacts field 404 (e.g., a counter representing the number of contacts initiated by a particular customer within a predetermined amount of time), an average contact time field 408 (e.g., for tracking the average amount of time that a contact initiated by the customer takes to fully service by all agents or by a sub-set of agents having a particular skill level), and a nature of contacts field 412 (e.g., for tracking the difficulty/subject matter and/or type of contacts initiated by the customer).

The third type of data structure that may be utilized by the dynamic notification system of the present invention is an agent average data structure 500. The agent average data structure 500 may include a number of different fields for tracking performance metrics 160 associated with a collection of agents. The agents considered in populating the agent average data structure 500 may be based on the agent skill set/expertise and skill level, the agent's primary and secondary functions, the amount of experience that the agent has, etc. The types of fields that may be included, without limitation, in the agent average data structure 500 are an average contacts handled field 504, an average contact time field 508, an average duration field 512, and average wrap-up field 516, an average idle field 520, and an average hold duration field 524. Each of these fields may contain a collection of performance criteria from the selected group of agents.

Any changes in the various data structures 300, 400, 500 may be detected and retrieved by the content application 140 and pushed to the appropriate data field 156 of the report(s) 152, 212 being displayed via the supervisor communication device 120.

Figure 6:
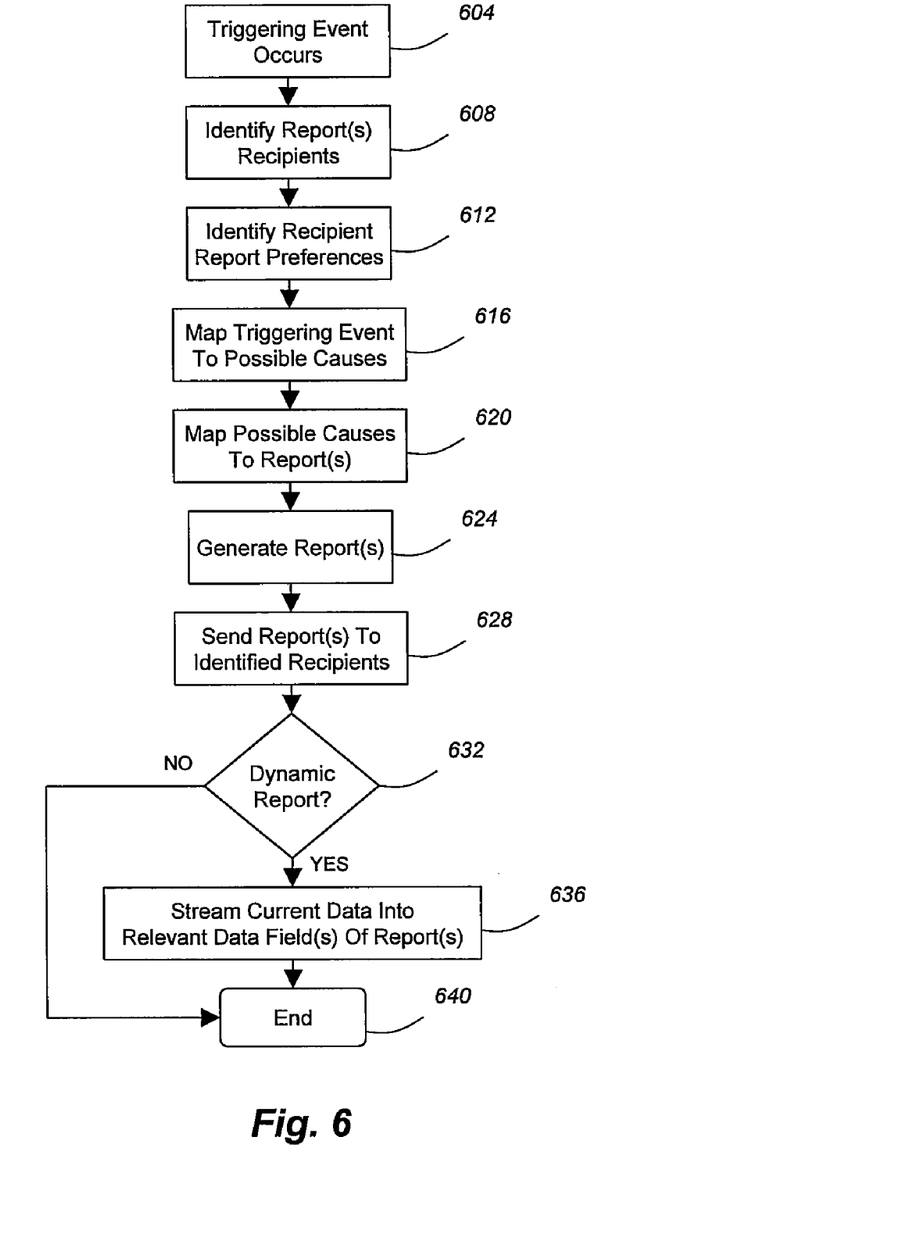
FIG. 6 is a flow diagram depicting a monitoring and reporting method in accordance with embodiments of the present invention.

Referring now to FIG. 6, a monitoring and reporting method will be described in accordance with at least some embodiments of the present invention. The method is initiated when a triggering event 204 occurs and is detected by the monitoring agent 132 (step 604). The triggering event 204 may be associated with one or more performance metrics 160 having a predetermined relationship (e.g., meeting, exceeding, falling below) with a predetermined threshold.

When the monitoring agent 132 detects one or more triggering events 204, the method continues with the dynamic notification agent 136 determining the identity of the report (s) 152, 212 recipients and their associate preferences (steps 608 and 612). The recipients of the report(s) 152, 212 may include any entity that is interested in the performance of the agent or object of interest. In accordance with at least one embodiment of the present invention, the mapping process between possible cause(s) 208 and report(s) 152, 212 may be executed in a two-step process where the first step is a mapping based on associated performance metrics 160. Then, in the second step, and after the identified recipients of the report(s) 152, 212 have been determined, the initial mapping is reduced based on the identified recipient preferences. This allows a report recipient to receive only those reports that are relevant and useful to the recipient, thereby aiding the report recipient to more effectively determine the actual cause of a triggering event 204.

Thereafter, the method may continue with the monitoring agent 132 mapping the triggering event(s) 204 to one or more possible causes 208 (step 616). As noted above, the possible cause(s) 208 may be associated with one or more performance metrics 160 that were also associated with the triggering event 204. Alternatively, the possible cause(s) 208 may not have any performance metrics 160 associated therewith that are in common with the performance metrics 160 associated with the triggering event 204.

The possible cause(s) 208 may then be mapped to one or more reports 152, 212 (step 620). The mapping between possible causes 208 and reports 152, 212 may be based on recipient preferences and/or associated performance metrics 160. After the report(s) 152, 212 recipients have been determined, the dynamic notification agent 136 continues by generating the necessary report(s) 152, 212 (step 624). The reports 152, 212 may be generated using HTML pages and the data fields 156 of the reports may be populated with various performance metrics 160 retrieved by the content application 140. Once the report(s) 152, 212 have been generated by the dynamic notification agent 136, the report(s) 152, 212 are then transmitted to the identified recipients (step 628). The report(s) 152, 212 may be transmitted to the supervisor communication device 120 where the HTML pages can be displayed to the recipient (e.g., in the form of a pop-up web-page or the like). The report may also include information that is delivered to the supervisor communication device 120 in the form of an audio message (e.g. voice XML) sent directly to the recipient.

The method continues with the dynamic notification agent 136 determining whether the report(s) 152, 212 being provided are dynamic reports (step 632). If the report(s) 152, 212 are not dynamic reports, then the method ends in step 640. If, however, the reports are to be dynamically updated, then the content application 140 continues pulling performance metrics 160 from the database 144 as they are updated and streams the current data into the appropriate data fields 156 of the report(s) 152, 212 (step 636). The report(s) 152, 212 may continue to be updated for a predetermined amount of time or until the report recipient determines that the report(s) 152, 212 are no longer necessary.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using procedural or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for monitoring and reporting metrics related to the performance of one or more objects of interest. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
    determining that a triggering event has occurred;
    mapping the triggering event to at least one possible cause;
    mapping the at least one possible cause to at least one report that displays at least one performance metric that is related to the triggering event in a data field that is dynamically updated as the at least one performance metric changes over time; and
    providing the at least one report to an identified recipient;
    wherein mapping the at least one possible cause to the at least one report comprises:
    identifying each performance metric that is associated with the at least one possible cause;
    identifying each performance metric that is associated with the at least one report;
    comparing the identified performance metrics associated with the at least one possible cause with the identified performance metrics associated with the at least one report;
    determining that a predetermined number of performance metrics are in common between the identified performance metrics respectively associated with at least one possible cause and the at least one report; and determining that the at least one possible cause is to be mapped to the at least one report.

2. The method of claim 1, further comprising:

detecting that the at least one performance metric has changed in a database;

retrieving the at least one performance metric from the database; and inserting the retrieved at least one performance metric in the data field of the at least one report.

3. The method of claim 1, wherein mapping the at least one possible cause to the at least one report further comprises:

determining report preferences for an identified recipient of the at least one report; and mapping the at least one possible cause to at least one report based on the determined report preferences of the identified recipient.

4. The method of claim 3, wherein the recipient preference mapping between the at least one possible cause and the at least one report is done only for the reports that were selected based on the performance metric mapping.

5. The method of claim 1, wherein the at least one performance metric comprises performance metrics associated with a contact center agent and wherein the at least one report is provided to a supervisor of the contact center agent.

6. The method of claim 1, wherein the at least one report is provided to the identified recipient in the form of a web-page that is generated and sent to the identified recipient using HyperText Markup Language (HTML) code and wherein the data field is updated using HTML code.

7. The method of claim 1, wherein the at least one report is provided to the identified recipient in the form of an audio message.

8. A non-transitory computer readable medium comprising processor executable instructions operable to perform the method of claim 1.

9. Contact center servicing equipment, comprising:

a monitoring agent operable to determine that a triggering event has occurred and map the triggering event to at least one possible cause;

a dynamic notification agent operable to map the at least one possible cause to at least one report that displays at least one performance metric that is related to the triggering event in a data field that is dynamically updated as the at least one performance metric changes over time and provide the at least one report to an identified recipient;

wherein the dynamic notification agent is operable to map the at least one possible cause to the at least one report by identifying each performance metric that is associated with the at least one possible cause, identifying each performance metric that is associated with the at least one report, comparing the identified performance metrics associated with the at least one possible cause with the identified performance metrics associated with the at least one report, determining that a predetermined number of performance metrics are in common between the identified performance metrics associated with the at least one possible cause and the at least one report, respectively, and determining that the at least one possible cause is to be mapped to the at least one report.

10. The equipment of claim 9, further comprising a content application operable to detect that the at least one performance metric has changed in a database, retrieve the at least one performance metric from the database, and insert the retrieved at least one performance metric in the data field of the at least one report.

11. The equipment of claim 9, wherein dynamic notification agent is further operable to map the at least one possible cause to the at least one report by determining report preferences for an identified recipient of the at least one report and mapping the at least one possible cause to at least one report based on the determined report preferences of the identified recipient.

12. The equipment of claim 11, wherein the dynamic notification agent is further operable to perform the recipient preference mapping between the at least one possible cause and the at least one report only for the reports that were selected based on the performance metric mapping.

13. The method of claim 9, wherein the at least one performance metric comprises performance metrics associated with a contact center agent and wherein the at least one report is provided to a supervisor of the contact center agent.

14. The method of claim 9, wherein the at least one report is provided to the identified recipient in the form of at least one of (i) a web-page that is generated and sent to the identified recipient using HyperText Markup Language (HTML) code and wherein the data field is updated using HTML code and (ii) an audio message.

15. A communication system, comprising:

means for determining that a triggering event has occurred;

means for mapping the triggering event to at least one possible cause;

means for mapping the at least one possible cause to at least one report that displays at least one performance metric that is related to the triggering event in a data field that is dynamically updated as the at least one performance metric changes over time; and means for providing the at least one report to an identified recipient;

wherein the means for mapping the at least one possible cause to the at least one report comprises:

means for identifying each performance metric that is associated with the at least one possible cause;

means for identifying each performance metric that is associated with the at least one report;

means for comparing the identified performance metric associated with the at least one possible cause with the identified performance metrics associated with the at least one report;

means for determining that a predetermined number of performance metrics are in common between the at least one possible cause and the at least one report; and means for determining that the at least one possible cause is to be mapped to the at least one report.

16. The system of claim 15, further comprising:

means for detecting that the at least one performance metric has changed in a database;

means for retrieving the at least one performance metric from the database; and means for inserting the retrieved at least one performance metric in the data field of the at least one report.

17. The system of claim 15, wherein the means for mapping the at least one possible cause to the at least one report further comprises:

means for determining report preferences for an identified recipient of the at least one report; and means for mapping the at least one possible cause to at least one report based on the determined report preferences of the identified recipient, wherein the recipient preference mapping between the at least one possible cause and the at least one report is done only for the reports that were selected based on the performance metric mapping.

18. The system of claim 15, wherein the at least one report is provided to the identified recipient in the form of at least one of (i) a web-page that is generated and sent to the identified recipient using HyperText Markup Language (HTML) code and wherein the data field is updated using HTML code and (ii) an audio message.

* * * * *

UNITED STATES PATENT AND TRADEMARK OFFICE
CERTIFICATE OF CORRECTION

PATENT NO.        : 8,385,532 B1
APPLICATION NO.   : 12/119352
DATED             : February 26, 2013
INVENTOR(S)       : Marc Geist et al.

Page 1 of 1

It is certified that error appears in the above-identified patent and that said Letters Patent is hereby corrected as shown below:

In the Claims:

Column 14, line 43, delete "metric" and insert --metrics--.

Signed and Sealed this
Twenty-eighth Day of May, 2013

Teresa Stanek Rea
*Acting Director of the United States Patent and Trademark Office*